(12) United States Patent
Yuan et al.

(10) Patent No.: US 11,032,198 B2
(45) Date of Patent: Jun. 8, 2021

(54) METHOD AND APPARATUS FOR GENERATING ACL TABLE

(71) Applicant: Huawei Technologies Co., Ltd., Guangdong (CN)

(72) Inventors: Feng Yuan, Nanjing (CN); Tao Ma, Beijing (CN); Qinghua Yan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 16/283,363

(22) Filed: Feb. 22, 2019

(65) Prior Publication Data

US 2019/0190828 A1 Jun. 20, 2019

Related U.S. Application Data

(63) Continuation of application No. PCT/CN2017/089498, filed on Jun. 22, 2017.

(30) Foreign Application Priority Data

Aug. 25, 2016 (CN) .......................... 201610724457.6

(51) Int. Cl.
*H04L 12/741* (2013.01)
*H04L 12/54* (2013.01)
(Continued)

(52) U.S. Cl.
CPC ............ *H04L 45/745* (2013.01); *H04L 12/54* (2013.01); *H04L 45/02* (2013.01); *H04L 45/04* (2013.01);
(Continued)

(58) Field of Classification Search
CPC ..... H04L 63/101; H04L 45/745; H04L 12/54; H04L 45/02; H04L 45/04; H04L 45/54;
(Continued)

(56) References Cited

U.S. PATENT DOCUMENTS 6,377,577 B1   4/2002 Bechtolsheim et al.
7,133,914 B1  11/2006 Holbrook
(Continued)

FOREIGN PATENT DOCUMENTS

CN   101035060 A   9/2007
CN   101411136 A   4/2009
(Continued)

*Primary Examiner* — Ian N Moore
*Assistant Examiner* — Sun Jong Kim
(74) *Attorney, Agent, or Firm* — Rimon PC

(57) ABSTRACT

A method and an apparatus are disclosed for generating an ACL table. A controller obtains a port type of each port of a first network device, and selects, based on the port type of each port, a target port whose port type is a preset type from all ports of the first network device. The controller generates a corresponding first-type access control list ACL entry for each target port, and generates one second-type ACL entry corresponding to a routing table of the first network device, where an action of the second-type ACL entry is redirecting to the routing table. The controller adds the second-type ACL entry and each first-type ACL entry to an ACL table of the first network device.

14 Claims, 9 Drawing Sheets

(51) Int. Cl.
 *H04L 12/751* (2013.01)
 *H04L 12/715* (2013.01)
 *H04L 12/771* (2013.01)
 *H04L 29/06* (2006.01)

(52) U.S. Cl.
 CPC .............. *H04L 45/54* (2013.01); *H04L 45/56* (2013.01); *H04L 63/101* (2013.01)

(58) Field of Classification Search
 CPC ......... H04L 47/80; H04L 45/44; H04L 49/70; H04L 61/2517
 See application file for complete search history.

(56) References Cited

U.S. PATENT DOCUMENTS

| | | |
|---|---|---|
| 7,313,667 B1 | 12/2007 | Pullela et al. |
| 7,536,476 B1 | 5/2009 | Alleyne |
| 7,792,113 B1 | 9/2010 | Foschiano et al. |
| 8,719,917 B1 | 5/2014 | Ammundi |
| 2009/0154348 A1* | 6/2009 | Newman ............... H04L 43/18 370/230 |
| 2009/0259811 A1 | 10/2009 | Krishnan |
| 2012/0147898 A1* | 6/2012 | Koponen .............. H04L 49/70 370/422 |
| 2014/0082122 A1 | 3/2014 | Basso et al. |
| 2014/0082195 A1 | 3/2014 | Basso et al. |
| 2014/0114995 A1* | 4/2014 | Kelley ................... H04L 45/38 707/758 |
| 2014/0269290 A1 | 9/2014 | Cors et al. |
| 2015/0006953 A1 | 1/2015 | Holbrook et al. |
| 2016/0337726 A1* | 11/2016 | Yan ......................... H04L 49/15 |
| 2017/0353328 A1* | 12/2017 | Chickering ............ H04L 69/324 |
| 2018/0332045 A1* | 11/2018 | Lin .......................... H04L 45/16 |

FOREIGN PATENT DOCUMENTS

| | | |
|---|---|---|
| CN | 101651623 A | 2/2010 |
| CN | 104821913 A | 8/2015 |
| JP | 2010-057034 A | 3/2010 |

\* cited by examiner

METHOD AND APPARATUS FOR GENERATING ACL TABLE

CROSS-REFERENCE TO RELATED APPLICATIONS

This application is a continuation of International Application No. PCT/CN2017/089498, filed on Jun. 22, 2017, which claims priority to Chinese Patent Application No. 201610724457.6, filed on Aug. 25, 2016, the disclosures of the aforementioned applications are hereby incorporated by reference in their entireties.

TECHNICAL FIELD

The present disclosure relates to the data center field, and in particular, to a method and an apparatus for generating an access control list (ACL) table.

BACKGROUND

To meet a rapid data growth requirement of a data center (DC), a DC network with a two-level full mesh architecture based on an optical cross-connect technology has emerged.

In the two-level mesh architecture, switches in the DC network are divided into several groups, each switch is connected to all other switches in a same group, and each switch is connected to switches, corresponding to the switch, in all other groups.

For example, a two-level mesh architecture in FIG. 1 includes three switch groups, and each switch group includes three switches. For example, a first group includes switches S11, S12, and S13, a second group includes switches S21, S22, and S23, and a third group includes switches S31, S32, and S33. Each switch is connected to other switches in a switch group to which the switch belongs, and each switch is connected to corresponding switches in other switch groups. For example, S11 is connected to S12 and S13 that belong to the first group, and is also connected to S21 in the second group and S31 in the third group. With the foregoing connection, each switch can communicate with any switch in the two-level mesh architecture.

In the two-level mesh architecture, each switch includes a plurality of ports, and the ports are divided into a user side port and a network side port. The user side port is configured to connect to a server (not shown in the figure), and the network side port is configured to connect to other switches. Two servers connected to different switches can communicate with each other based on ACL tables. When a switch receives a packet sent by a server connected to the switch, the switch forwards the packet based on the ACL table, so that the packet finally reaches a destination server.

Each switch stores an ACL table, and the ACL table includes an ACL table of each port. An ACL table includes a match field and an action. There may be one or more match fields, for example, at least one of a port number of a port receiving a packet and a destination Internet Protocol (IP) address of the packet.

As an ACL table needs to be implemented by a ternary content addressable memory (TCAM) device of a dedicated chip in a switch, in the foregoing method, a corresponding ACL table needs to be configured in the switch for each flow that passes through each port of the switch. However, the ACL table is stored in the TCAM of the dedicated chip in the switch. Therefore, when a data center network is quite large, a hyperscale TCAM is required. However, the hyperscale TCAM cannot be produced based on a current technology. As a result, it is difficult to expand a capacity of the data center network.

SUMMARY

To resolve a prior-art problem, the present disclosure provides a method and an apparatus for generating an ACL table to reduce a size of the ACL table and lower a requirement on TACM specifications.

According to a first aspect, an embodiment of the present disclosure provides a method for generating an ACL table, where the method includes:

obtaining a port type of each port of a first network device;

selecting, based on the port type of each port, a target port whose port type is a preset type from all ports of the first network device;

generating a corresponding first-type access control list ACL entry for each target port;

generating one second-type ACL entry corresponding to a routing table of the first network device, where an action of the second-type ACL entry is redirecting to the routing table; and adding the second-type ACL entry and each first-type ACL entry to an ACL table of the first network device.

In this embodiment of the present disclosure, the corresponding first-type ACL entry is generated for the target port of the preset port type of the first network device, one second-type ACL entry corresponding to the routing table of the first network device is generated, and the second-type ACL entry and each first-type ACL entry are added to the ACL table of the first network device.

The ACL entries include only the first-type ACL entry corresponding to the target port and the second-type ACL entry corresponding to the routing table, so that a quantity of ACL entries in the ACL table is reduced, and a requirement on TCAM resource specifications is lowered, thereby facilitating data center network expansion.

In a possible design, the obtaining a port type of each port of a first network device includes:

monitoring each port of the first network device after the first network device goes online;

determining a port type of a port identified in a notification packet received within preset duration as an interconnection type; and determining a port type of a port not identified in a notification packet received within the preset duration as a default type.

In this embodiment of the present disclosure, the port type of each port of the first network device is obtained by using a probe packet. The operation is simple, so that a time for obtaining the port type is shorted, and efficiency of obtaining the port type is improved.

In another possible design, the interconnection type includes an intra-group interconnection type and an inter-group interconnection type; and the determining a port type of a port identified in a notification packet received within preset duration as an interconnection type includes:

for a port identified in each notification packet received within the preset duration, determining, based on an identifier, in the notification packet, of a device group to which a peer network device sending the notification packet belongs, whether the peer network device and the first network device belong to a same device group; and when the peer network device and the first network device belong to the same device group, determining that the port type of the port is the intra-group interconnection type; or when the peer network device and the first network device do not belong to the same device group, determining that the port type of the port is the inter-group interconnection type.

In this embodiment of the present disclosure, in a mesh architecture with at least two levels, the interconnection type includes the intra-group interconnection type and the inter-group interconnection type, so that the port type is more refined and a more accurate ACL table is generated.

In another possible design, the preset type includes the default type and the intra-group interconnection type.

In this embodiment of the present disclosure, the first-type ACL entry is generated only for a target port of the default type and a target port of the intra-group interconnection type, so that a quantity of ACL entries in the ACL table is reduced.

In another possible design, the first-type ACL entry is an ACL entry including the target port; and the generating a corresponding first-type access control list ACL entry for each target port includes:

determining a second network device in a network architecture in which the first network device is located, where the second network device is any network device in the network architecture different from the first network device;

generating the routing table, where each entry of the routing table includes a next hop from the first network device to one second network device; and for each target port, determining, based on the routing table, an action of the target port corresponding to each second network device, and for each second network device, generating an ACL entry including the target port, the second network device, and the action of the target port corresponding to the second network device.

In another possible design, a priority of the second-type ACL entry is lower than a priority of each first-type ACL entry.

In the ACL table, the priority of the second-type ACL entry is lower than the priority of each first-type ACL entry, so that when the first network device receives traffic, the traffic can be accessed preferably based on the first-type ACL entry, thereby improving access efficiency.

According to a second aspect, an embodiment of the present disclosure provides an apparatus for generating an ACL table, where the apparatus includes:

an obtaining module, configured to obtain a port type of each port of a first network device;

a selection module, configured to select, based on the port type of each port, a target port whose port type is a preset type from all ports of the first network device;

a first generation module, configured to generate a corresponding first-type access control list ACL entry for each target port;

a second generation module, configured to generate one second-type ACL entry corresponding to a routing table of the first network device, where an action of the second-type ACL entry is redirecting to the routing table; and an adding module, configured to add the second-type ACL entry and each first-type ACL entry to an ACL table of the first network device.

The apparatus for generating an ACL table in the second aspect can implement the method according to any one of the first aspect or the implementations of the first aspect, and corresponding effects can be achieved.

According to a third aspect, an embodiment of the present disclosure provides an apparatus for generating an ACL table, where the apparatus includes a processor, a memory, and a communications interface.

The memory and the communications interface are separately connected to the processor. The memory is configured to store program code, where the program code includes a computer operation instruction. The processor executes the program code stored in the memory, to implement the method according to any one of the first aspect or the implementations of the first aspect. A port type of a port identified in a notification packet received within preset duration is determined as an interconnection type, and a port type of a port not identified in a notification packet received within the preset duration is determined as a default type. For a port identified in each notification packet received within the preset duration, it is determined, based on an identifier, in the notification packet, of a device group to which a peer network device sending the notification packet belongs, whether the peer network device and the first network device belong to a same device group.

According to a fourth aspect, an embodiment of the present disclosure provides a computer storage medium, to store computer program code developed to implement the method according to any one of the first aspect or the implementations of the first aspect.

In the foregoing embodiments of the present disclosure, the corresponding first-type ACL entry is generated for the target port of the preset port type of the first network device, one second-type ACL entry corresponding to the routing table of the first network device is generated, and the second-type ACL entry and each first-type ACL entry are added to the ACL table of the first network device. The ACL entries include only the first-type ACL entry corresponding to the target port and the second-type ACL entry corresponding to the routing table, so that a quantity of ACL entries in the ACL table is reduced, and a requirement on TCAM resource specifications is lowered, thereby facilitating data center network expansion.

DESCRIPTION OF EMBODIMENTS

To make the objectives, technical solutions, and advantages of the present disclosure clearer, the following further describes the embodiments of the present disclosure in detail with reference to the accompanying drawings.

Figure 2:
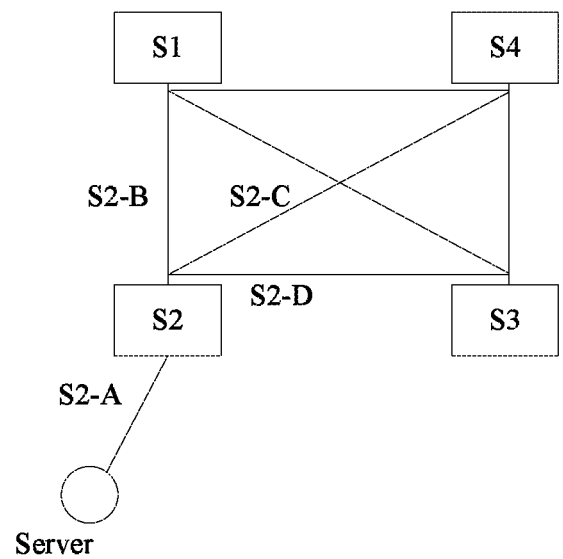
FIG. 2 is a schematic structural diagram of a one-level mesh architecture according to an embodiment of the present disclosure.

As shown in FIG. 2, FIG. 2 is a schematic structural diagram of a one-level mesh architecture according to an embodiment of the present disclosure. The one-level mesh architecture includes four network devices: S1, S2, S3, and S4. Each network device is connected to any other network device in the mesh architecture. Each network device includes a plurality of ports, and the plurality of ports include a user side port and a network side port. The user side port is a port connected to a host, and the network side port is a port connected to another network device. For example, in FIG. 2, S2-A is a user side port, and S2-B, S2-C, and S2-D are network side ports.

Figure 1:
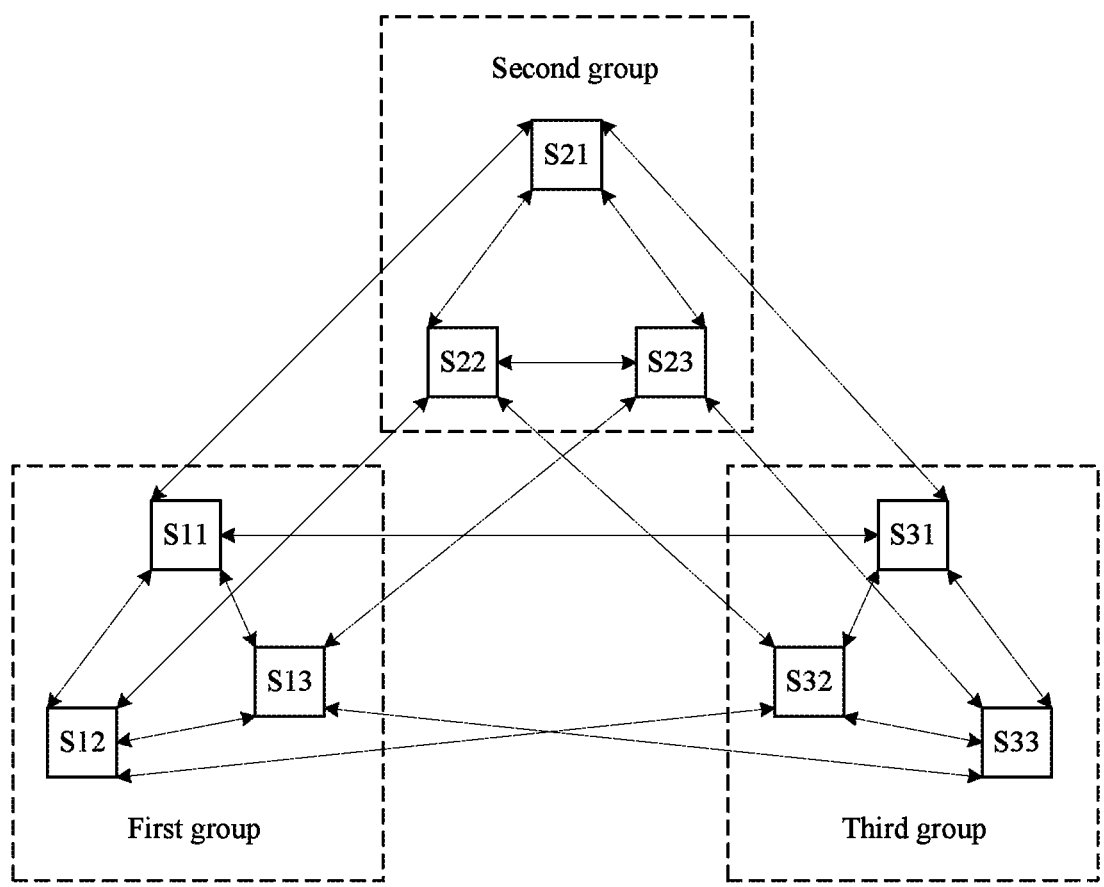
FIG. 1 is a schematic structural diagram of a two-level mesh architecture.
Figure 3:
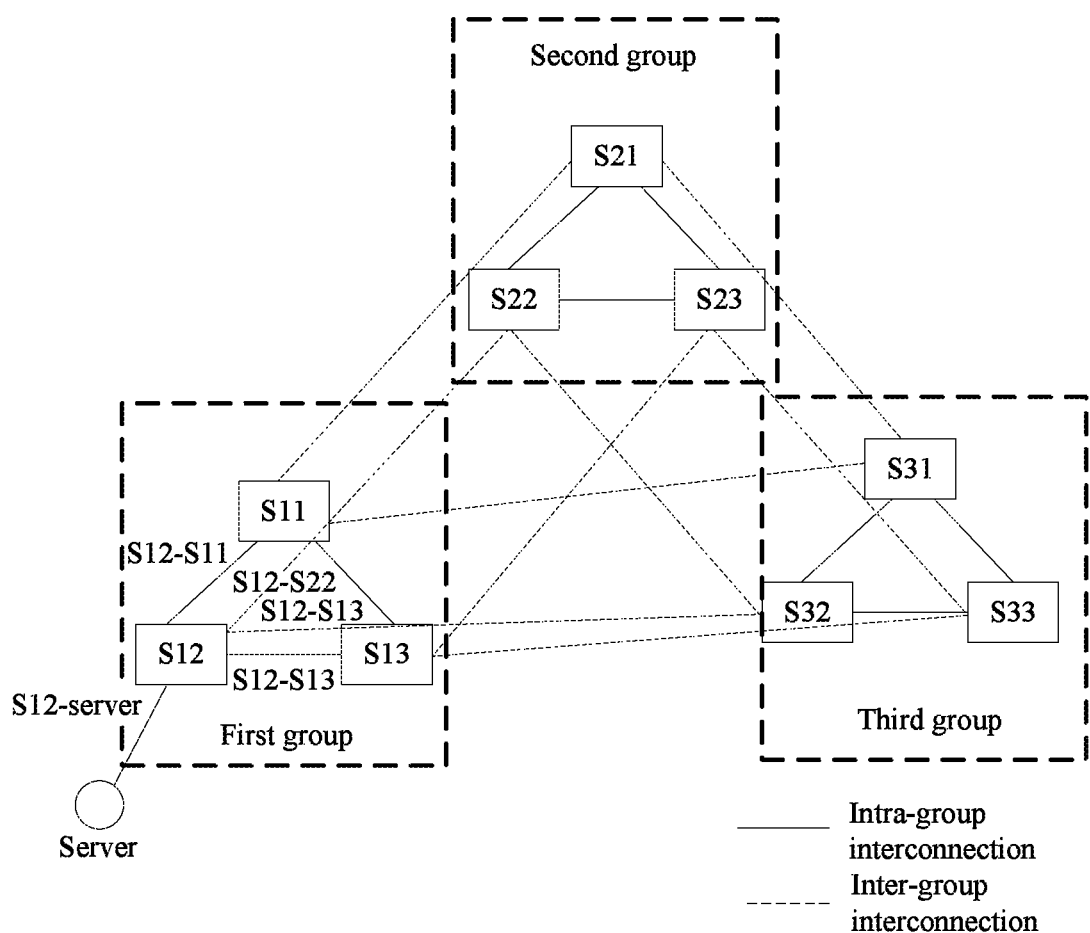
FIG. 3 is a schematic structural diagram of a two-level mesh architecture according to an embodiment of the present disclosure.

As shown in FIG. 3, FIG. 3 is a schematic structural diagram of a two-level mesh architecture according to an embodiment of the present disclosure. The network architecture includes a plurality of groups of network devices. Three groups are shown in FIG. 3: a first group of network devices, a second group of network devices, and a third group of network devices. The first group of network devices include S11, S12, and S13, the second group of network devices include S21, S22, and S23, and the third group of network devices include S31, S32, and S33. For a connection relationship between each network device and other network devices, refer to the description for FIG. 1. Different from FIG. 1, different types of connections are indicated by different line types in FIG. 3. This will be described in detail later. The two-level mesh architecture in FIG. 3 may be extended from the one-level mesh architecture in FIG. 2.

Based on the one-level mesh architecture shown in FIG. 2 or the two-level mesh architecture shown in FIG. 3, an embodiment of the present disclosure provides a method for generating an ACL table. The method is executed by a network device such as a controller, a router, or a switch.

Figure 4:
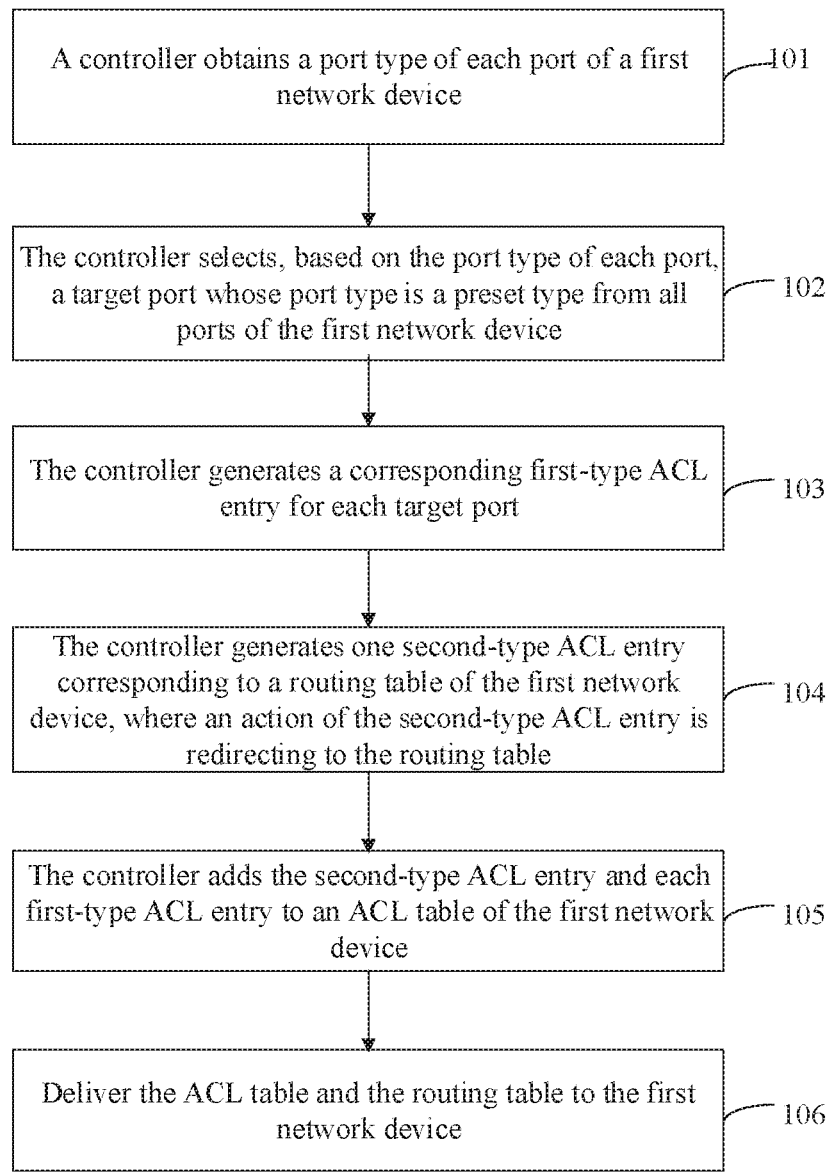
FIG. 4 is a flowchart of a method for generating an ACL table according to an embodiment of the present disclosure.

For example, in this embodiment of the present disclosure, the method is executed by a controller. Referring to FIG. 4, the method includes the following steps.

Step 101: The controller obtains a port type of each port included in a first network device.

The first network device is any network device in a network architecture, and the first network device may be a router, a switch, or the like.

Figure 5:
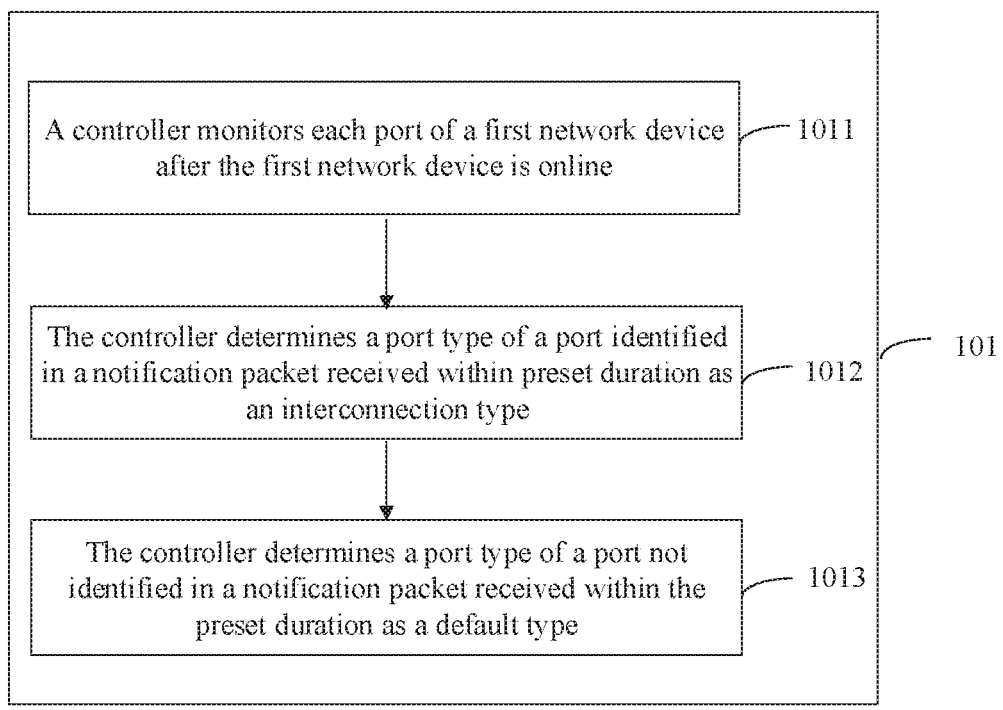
FIG. 5 is a flowchart of a method for obtaining, by a controller, a port type of each port included in a first network device according to an embodiment of the present disclosure.

Referring to FIG. 5, this step may be implemented by performing steps 1011 to 1013, including:

1011: The controller monitors each port of the first network device after the first network device goes online.

After the first network device goes online, a connection is established between the first network device and the controller. In this case, the controller learns that the first network device enters the network architecture, and the controller sends an instruction packet to the first network device. The instruction packet is used to enable the first network device to send a probe packet to a peer device directly connected to the first network device.

The first network device receives the instruction packet sent by the controller, and sends the probe packet to the peer device directly connected to the first network device. The probe packet is used to enable the peer device to send a notification packet to the controller after the peer device receives the probe packet sent by the first network device. The probe packet may be a Link Layer Discovery Protocol (LLDP) packet, a Packet Internet Groper (ping) packet, or the like.

If the peer device is a network device, the peer device sends a notification packet to the controller. The notification packet carries at least an identifier of a port that is of the first network device and that is connected to the peer device, where the port is located on the first network device. If the network architecture is a mesh architecture with at least two levels, the notification packet may also carry an identifier of a device group to which the peer device belongs.

The identifier of the port may be a number of the port, or the like: and the identifier of the device group may be a number of the device group, or the like.

If the peer device is a host, for example, a server, the peer device does not send a probe packet to the controller.

For each port of the first network device, a step of monitoring the port by the controller may be:

monitoring, by the controller, whether the notification packet sent by the peer device connected to the port is received within preset duration.

The preset duration may be set and changed based on a requirement. In this embodiment of the present disclosure, the preset duration is not specifically limited. For example, the preset duration may be 1 minute.

1012: The controller determines a port type of a port identified in a notification packet received within preset duration as an interconnection type.

For each port of the first network device, if the controller receives, within the preset duration, the notification packet carrying an identifier of the port, the controller determines that the port type of the port is the interconnection type.

Figure 6:
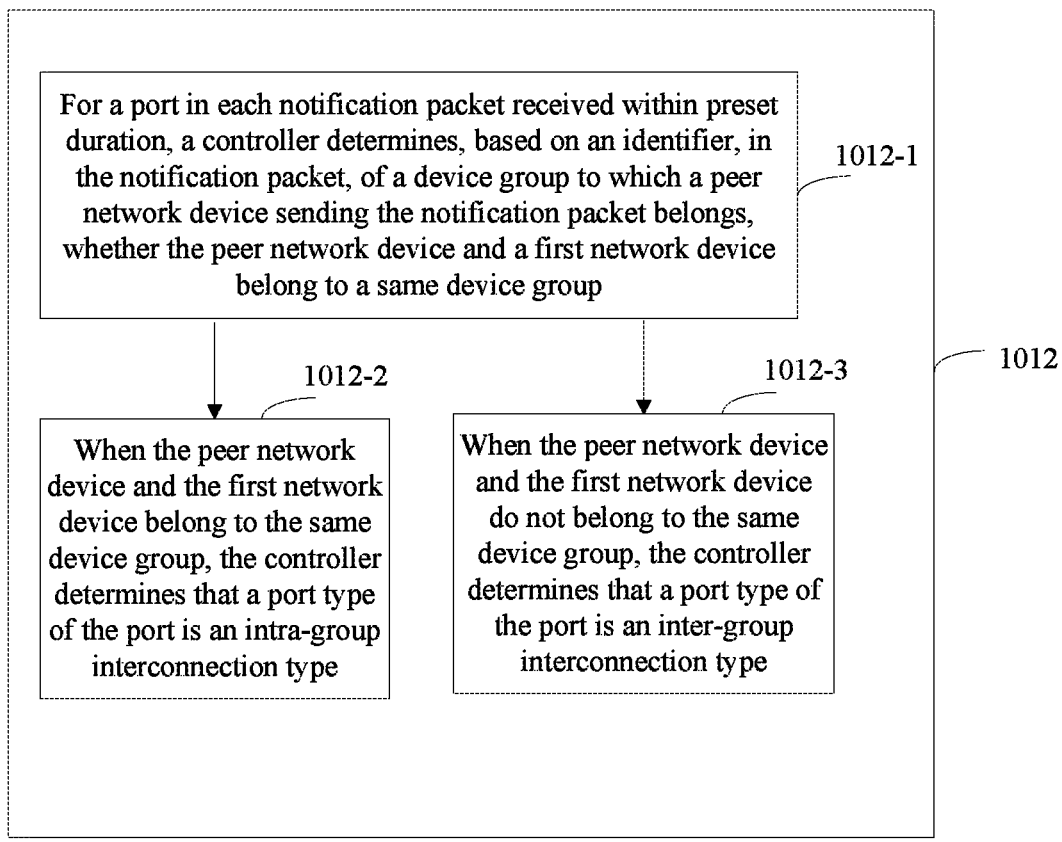
FIG. 6 is a flowchart of a method for determining, by a controller, a port type of a port identified in a notification packet received within preset duration as an interconnection type according to an embodiment of the present disclosure.

In the mesh architecture with at least two levels, there are a plurality of groups of network devices. Therefore, the interconnection type includes an intra-group interconnection type and an inter-group interconnection type. Correspondingly, referring to FIG. 6, this step may be implemented by performing the following steps 1012-1 to 1012-3, including:

1012-1: For a port identified in each notification packet received within the preset duration, the controller determines, based on an identifier, in the notification packet, of a device group to which a peer network device sending the notification packet belongs, whether the peer network device and the first network device belong to a same device group.

The notification packet carries the identifier of the device group to which the peer device belongs, and the controller obtains the identifier of the device group to which the peer device belongs from the notification packet, and obtains an identifier of a device group to which the first network device belongs from information stored in the controller. If the identifier of the device group to which the peer device belongs is the same as the identifier of the device group to which the first network device belongs, the controller determines that the peer device and the first network device belong to the same device group. If the identifier of the device group to which the peer device belongs is different from the device group to which the first network device belongs, the controller determines that the peer device and the first network device do not belong to the same device group.

1012-2: When the peer network device and the first network device belong to the same device group, the controller determines that the port type of the port is the intra-group interconnection type.

1012-3: When the peer network device and the first network device do not belong to the same device group, the controller determines that the port type of the port is the inter-group interconnection type.

1013: The controller determines a port type of a port not identified in a notification packet received within the preset duration as a default type.

For each port of the first network device, if the controller does not receive, within the preset duration, a notification packet carrying the identifier of the port, the controller determines that the port type of the port is the default type.

For example, in the one-level mesh architecture shown in FIG. 2, that S2 is the first network device is used as an example for description. Table 1 lists port types, obtained by the controller, of all ports included in S2.

TABLE 1

| Port | Port type |
| --- | --- |
| S2-A | Default type |
| S2-B | Interconnection type |
| S2-C | Interconnection type |
| S2-D | Interconnection type |

For another example, in the two-level mesh architecture shown in FIG. 3, a solid line indicates an intra-group interconnection, and a dashed line indicates an inter-group interconnection. That S12 is the first network device is used as an example for description. Table 2 lists port types, obtained by the controller, of all ports included in S12.

TABLE 2

| Port | Port type |
| --- | --- |
| S12-server | Default type |
| S12-S11 | Intra-group interconnection type |
| S12-S13 | Intra-group interconnection type |
| S12-S21 | Inter-group interconnection type |
| S12-S22 | Inter-group interconnection type |
| S12-S23 | Inter-group interconnection type |
| S12-S31 | Inter-group interconnection type |
| S12-S32 | Inter-group interconnection type |
| S12-S33 | Inter-group interconnection type |

S12-S11 is a port used by the switch S12 to connect to the switch S11, and other ports can be deduced by analogy.

Step 102: The controller selects, based on the port type of each port, a target port whose port type is a preset type from all ports of the first network device.

The preset type includes the default type and the intra-group interconnection type. Correspondingly, this step may be:

selecting, based on the port type of each port, a port whose port type is the default type or a port whose port type is the intra-group interconnection type from all the ports of the first network device, and determining the selected port as the target port.

For example, a target port selected by the controller from all ports of S2 based on Table 1 is S2-A.

For another example, target ports selected by the controller from all ports of S12 based on Table 2 are S12-server, S12-S13, and S12-S21.

Step 103: The controller generates a corresponding first-type ACL entry for each target port.

Figure 7:
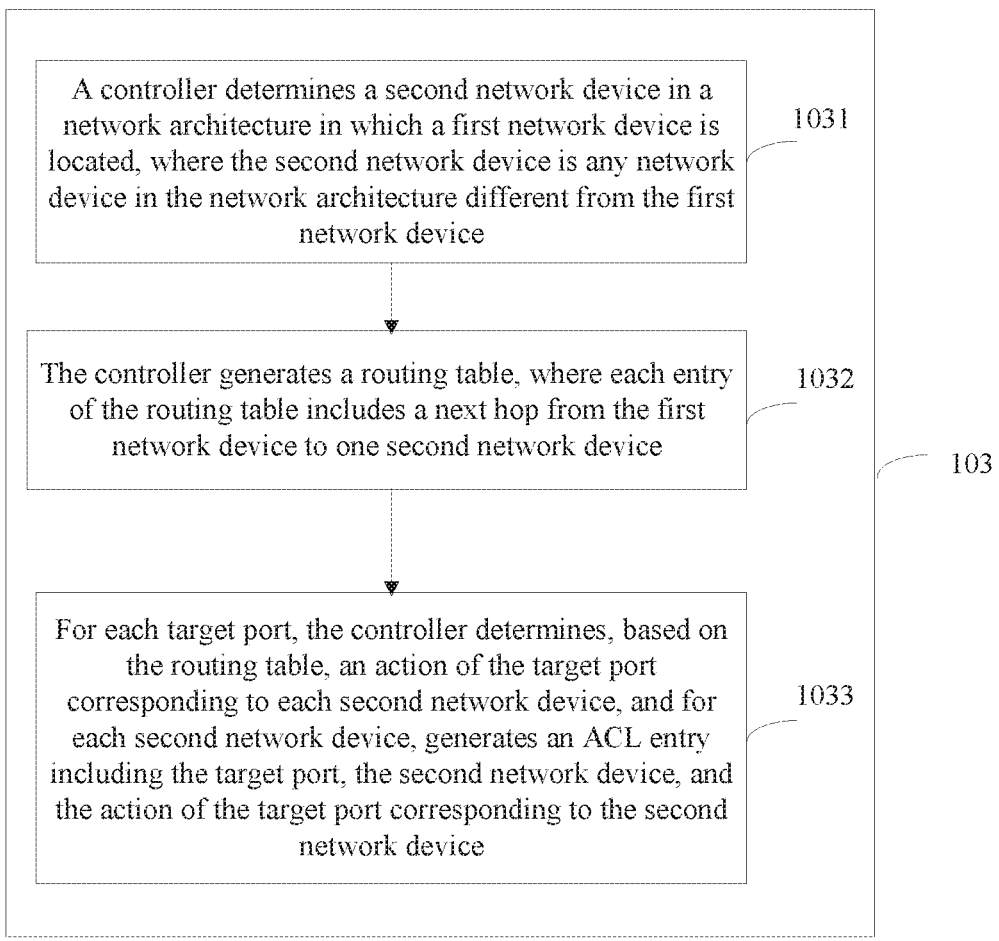
FIG. 7 is a flowchart of a method for generating, by a controller, a corresponding first-type ACL entry for each target port according to an embodiment of the present disclosure.

The first-type ACL entry is an ACL entry including the target port. Correspondingly, referring to FIG. 7, this step may be implemented by performing the following steps 1031 to 1033, including:

1031: The controller determines a second network device in a network architecture in which the first network device is located, where the second network device is any network device in the network architecture different from the first network device.

The second network device may be a router, a switch, or the like.

For example, the controller determines that the second network devices in the one-level mesh architecture in which S2 is located are S1, S3, and S4.

For another example, the controller determines that the second network devices in the two-level mesh architecture in which S12 is located are S11, S13, S21, S22, S23, S31, S32, and S33.

1032: The controller generates a routing table, where each entry of the routing table includes a next hop from the first network device to one second network device.

The controller generates a routing table of the first network device according to a preset routing algorithm. Each entry of the routing table includes at least the next hop from the first network device to one second network device (a destination network device), the next hop includes an IP address and an egress port, and the egress port may be one or more ports.

Each entry of the routing table may further include an identifier of the second network device, and a hop count from the first network device to the second network device.

The preset routing algorithm is any existing routing algorithm. In this embodiment of the present disclosure, the preset routing algorithm is not specifically limited. The routing table may be a forward information base (FIB) table, a routing information database table (RIB), a multi-path table, or the like.

For example, a routing table, of S2 in the one-level mesh architecture, generated by the controller is shown in the following Table 3.

TABLE 3

| Destination network device | Hop count | Next-hop IP address | Next-hop egress port |
| --- | --- | --- | --- |
| S1 | 1 | IP address corresponding to ports on S1 | S2-B |
|  | 2 | IP address corresponding to ports on S4 | S2-C |
|  | 2 | IP address corresponding to ports on S3 | S2-D |
| S3 | 1 | IP address corresponding to ports on S3 | S2-D |
|  | 2 | IP address corresponding to ports on S1 | S2-B |
|  | 2 | IP address corresponding to ports on S4 | S2-C |
| S4 | 1 | IP address corresponding to ports on S4 | S2-C |
|  | 2 | IP address corresponding to ports on S1 | S2-B |
|  | 2 | IP address corresponding to ports on S3 | S2-D |

For another example, a routing table, of S12 in the two-level mesh architecture, generated by the controller is shown in the following Table 4.

TABLE 4

| Destination network device | Hop count | Next-hop IP address | Next-hop egress port |
|---|---|---|---|
| S11 | 1 | IP address corresponding to ports on S11 | S12-S11 |
|  | 2 | IP address corresponding to ports on S13 | S12-S13 |
| S13 | 1 | IP address corresponding to ports on S13 | S12-S13 |
|  | 2 | IP address corresponding to ports on S11 | S12-S11 |
| S21 | 2 | IP address corresponding to ports on S11 | S12-S11 |
|  | 2 | IP address corresponding to ports on S22 | S12-S22 |
|  | 3 | IP address corresponding to ports on S13 | S12-S13 |
|  | 3 | IP address corresponding to ports on S32 | S12-S32 |
| S22 | 1 | IP address corresponding to ports on S22 | S12-S22 |
|  | 2 | IP address corresponding to ports on S32 | S12-S32 |
| S23 | 2 | IP address corresponding to ports on S13 | S12-S13 |
|  | 2 | IP address corresponding to ports on S22 | S12-S22 |
|  | 3 | IP address corresponding to ports on S11 | S12-S11 |
|  | 3 | IP address corresponding to ports on S32 | S12-S32 |
| ... | ... | ... | ... |

1033: For each target port, the controller determines, based on the routing table, an action of the target port corresponding to each second network device, and for each second network device, generates an ACL entry including the target port, the second network device, and the action of the target port corresponding to the second network device.

The step of determining, by the controller based on the routing table, an action of the target port corresponding to each second network device may be:

for each target port and each second network device, obtaining, by the controller from the routing table, a next-hop egress port of the second network device corresponding to the target port, and determining the next-hop egress port as the action of the target port corresponding to the second network device.

For example, for a target port S2-A on S2, the first-type ACL entry generated by the controller for the target port are shown in the following Table 5.

TABLE 5

| Target port (from the default-type port in Table 1) | Second network device (from the destination network device in Table 3) | Action of a target port corresponding to a second network device (from the next-hop egress port in Table 2) |
|---|---|---|
| S2-A | S1 | S2-B |
|  |  | S2-C |
|  |  | S2-D |
| S2-A | S3 | S2-D |
|  |  | S2-B |
|  |  | S2-C |
| S2-A | S4 | S2-C |
|  |  | S2-B |
|  |  | S2-D |

The action of the target port corresponding to the second network device is forwarding a packet to a next-hop egress port. For example, when the destination network device of the target port S2-A is S1, corresponding actions S2-B, S2-C, and S2-D mean that a packet may be forwarded by using any of the next-hop egress ports S2-B, S2-C, and S2-D.

For another example, for ease of description, only a target port of the default port type is selected from all the ports of S12. Using the target port S12-server on S12 as an example, the first-type ACL entry generated by the controller for the target port is shown in the following Table 6.

TABLE 6

| Target port (from the default-type port in Table 2) | Second network device (from the destination network device in Table 4) | Action of a target port corresponding to a second network device (from the next-hop egress port in Table 4) |
|---|---|---|
| S12-server | S11 | S12-S11 |
|  |  | S12-S13 |
| S12-server | S13 | S12-S13 |
|  |  | S12-S11 |
| S12-server | S21 | S12-S11 |
|  |  | S12-S22 |
|  |  | S12-S13 |
|  |  | S12-S32 |
| S12-server | S22 | S12-S22 |
|  |  | S12-S32 |
| S12-server | S23 | S12-S13 |
|  |  | S12-S22 |
|  |  | S12-S11 |
|  |  | S12-S32 |
| S12-server | S31 | S12-S11 |
|  |  | S12-S32 |
|  |  | S12-S33 |
| S12-server | S32 | S12-S11 |
|  |  | S12-S32 |
|  |  | S12-S33 |
| S12-server | S33 | S12-S11 |
|  |  | S12-S32 |
|  |  | S12-S33 |

Step 104: The controller generates one second-type ACL entry corresponding to a routing table of the first network device, where an action of the second-type ACL entry is redirecting to the routing table.

Figure 8:
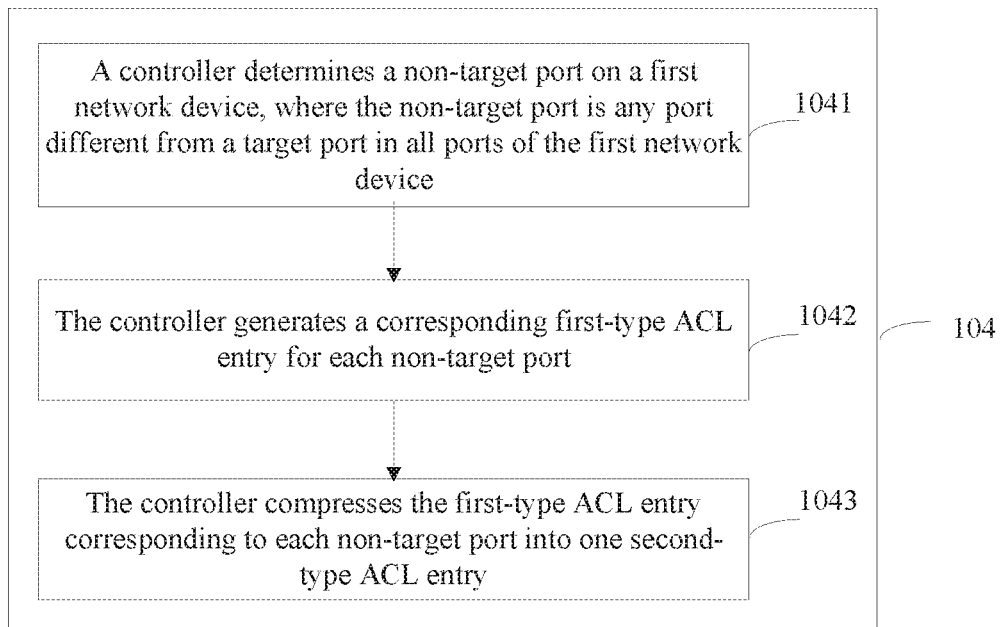
FIG. 8 is a flowchart of a method for generating, by a controller, one second-type ACL entry corresponding to a routing table of a first network device according to an embodiment of the present disclosure.

The second-type ACL entry is an ACL entry including the routing table. Referring to FIG. 8, this step may be implemented by performing the following steps 1041 to 1043, including:

1041: The controller determines a non-target port on the first network device, where the non-target port is any port different from the target port in all the ports of the first network device.

1042: The controller generates a corresponding first-type ACL entry for each non-target port.

For each non-target port, the controller determines, based on the routing table, an action of the non-target port corresponding to each second network device; generates, for each second network device, a first-type ACL entry including the non-target port, the second network device, and the action of the non-target port corresponding to the second network device; and compresses the first-type ACL entry corresponding to each non-target port.

The step of compressing, by the controller, the first-type ACL entry corresponding to each non-target port may be:

extracting, by the controller from the ACL entry corresponding to each non-target port, the second network device and the action of the non-target port corresponding to the second network device.

The step of determining, by the controller based on the routing table, an action of the non-target port corresponding to each second network device may be:

for each non-target port and each second network device, obtaining, by the controller from the routing table, a next-hop egress port with a minimum hop count from the non-target port to the second network device, and determining the next-hop egress port with the minimum hop count as the action of the non-target port corresponding to the second network device.

1043: The controller compresses the first-type ACL entry corresponding to each non-target port into one second-type ACL entry.

For example, first-type ACL entries generated by the controller for the non-target ports S2-B, S2-C, and S2-D on S2 are shown in the following Table 7.

TABLE 7

| Non-target port (from the interconnection-type port in Table 1) | Second network device (from the destination network device in Table 3) | Action of a non-target port corresponding to a second network device (from the next-hop egress port with a minimum hop count to a destination network device in Table 3) |
|---|---|---|
| S2-B | S1 | S2-B |
| S2-B | S3 | S2-D |
| S2-B | S4 | S2-C |
| S2-C | S1 | S2-B |
| S2-C | S3 | S2-D |
| S2-C | S4 | S2-C |
| S2-D | S1 | S2-B |
| S2-D | S3 | S2-D |
| S2-D | S4 | S2-C |

The controller compresses the first-type ACL entry corresponding to each non-target port, that is, compresses the entries in Table 7. A compression result is shown in the following Table 8.

TABLE 8

| Second network device (from the destination network device in Table 3) | Action of a non-target port corresponding to a second network device (from the next-hop egress port with a minimum hop count to a destination network device in Table 3) |
|---|---|
| S1 | S2-B |
| S3 | S2-D |
| S4 | S2-C |

The controller compresses the entries in Table 8 into one second-type ACL entry, and the action of the second-type ACL entry is redirecting to the routing table.

Further, the action of the second-type ACL entry is redirecting to the routing table and searching the routing table for only an egress port with the minimum hop count.

For another example, first-type ACL entries generated by the controller for the non-target ports S12-S11 and S12-S13 on S12 are shown in the following Table 9.

TABLE 9

| Non-target port (from the interconnection-type port in Table 2) | Second network device (from the destination network device in Table 4) | Action of a non-target port corresponding to a second network device (from the next-hop egress port with a minimum hop count to a destination network device in Table 4) |
|---|---|---|
| S12-S11 | S11 | S12-S11 |
| S12-S11 | S13 | S12-S13 |
| S12-S11 | S21 | S12-S11 |
| S12-S11 | S22 | S12-S22 |
| S12-S11 | S22 | S12-S22 |
| S12-S11 | S23 | S12-S13 |
| | | S12-S22 |
| S12-S11 | S31 | S12-S11 |
| | | S12-S22 |
| S12-S11 | S32 | S12-S32 |
| S12-S11 | S33 | S12-S13 |
| | | S12-S22 |
| S12-S13 | S11 | S12-S11 |
| S12-S13 | S13 | S12-S13 |
| S12-S13 | S21 | S12-S11 |
| | | S12-S22 |
| S12-S13 | S22 | S12-S22 |
| S12-S13 | S23 | S12-S22 |
| | | S12-S13 |
| S12-S13 | S31 | S12-S11 |
| | | S12-S32 |
| S12-S13 | S32 | S12-S32 |
| S12-S13 | S33 | S12-S13 |

The controller compresses the first-type ACL entry corresponding to each non-target port, that is, compresses the entries in Table 9. A compression result is shown in the following Table 10.

TABLE 10

| Second network device (from the destination network device in Table 4) | Action of a non-target port corresponding to a second network device (from the next-hop egress port with a minimum hop count to a destination network device in Table 4) |
|---|---|
| S11 | S12-S11 |
| S13 | S12-S13 |
| S21 | S12-S11 |
| | S12-S22 |
| S22 | S12-S22 |
| S23 | S12-S13 |
| | S12-S22 |
| S31 | S12-S11 |
| | S12-S22 |
| S32 | S12-S32 |
| S33 | S12-S13 |
| | S12-S22 |

Step 105: The controller adds the second-type ACL entry and each first-type ACL entry to an ACL table of the first network device.

In the ACL table, a priority of the second-type ACL entry is lower than a priority of each first-type ACL entry.

Further, the controller may alternatively add the first-type ACL entry corresponding to each target port and the compressed first-type ACL entry corresponding to each non-target port to the ACL table of the first network device.

For example, the controller adds Table 5 and Table 8 to the ACL table of the first network device, to obtain the following Table 11.

TABLE 11

| Target port | Second network device (from the destination network device in Table 3) | Action of a target port corresponding to a second network device (from the next-hop egress port in Table 2) |
|---|---|---|
| S2-A | S1 | S2-B<br>S2-C<br>S2-D |
| S2-A | S3 | S2-D<br>S2-B<br>S2-C |
| S2-A | S4 | S2-C<br>S2-B<br>S2-D |
| . . .<br>None | . . .<br>Any | . . .<br>Redirect to a routing table |

For another example, the controller adds Table 9 and Table 10 to the ACL table of the first network device, to obtain the following Table 12.

TABLE 12

| Target port (from the default-type port in Table 2) | Second network device (from the destination network device in Table 4) | Action of a target port corresponding to a second network device (from the next-hop egress port in Table 4) |
|---|---|---|
| S12-server | S11 | S12-S11<br>S12-S13 |
| S12-server | S13 | S12-S13<br>S12-S11 |
| S12-server | S21 | S12-S11<br>S12-S22<br>S12-S13<br>S12-S32 |
| S12-server | S22 | S12-S22<br>S12-S32 |
| S12-server | S23 | S12-S13<br>S12-S22<br>S12-S11<br>S12-S32 |
| S12-server | S31 | S12-S11<br>S12-S32<br>S12-S33 |
| S12-server | S32 | S12-S11<br>S12-S32<br>S12-S33 |
| S12-server | S33 | S12-S11<br>S12-S32<br>S12-S33 |
| . . .<br>None | . . .<br>any | . . .<br>Redirect to a routing table |

In this embodiment of the present disclosure, a requirement on TCAM resource specifications for the ACL table is reduced, making it possible to build a super-large-scale two-level mesh architecture by using traditional network devices. In addition, the method is applicable to a mesh architecture with any quantity of levels, such as a one-level mesh architecture, a two-level mesh architecture, or even a mesh architecture with more levels.

Step 106: Deliver the ACL table and the routing table to the first network device.

It should be noted that step 106 is not a mandatory step. If an execution body is the controller, step 106 needs to be performed; if an execution body is the first network device, step 106 does not need to be performed.

In this embodiment of the present disclosure, the corresponding first-type ACL entry is generated for the target port of the preset port type of the first network device, one second-type ACL entry corresponding to the routing table of the first network device is generated, and the second-type ACL entry and each first-type ACL entry are added to the ACL table of the first network device.

The ACL entries include only the first-type ACL entry corresponding to the target port and the second-type ACL entry corresponding to the routing table, so that a quantity of ACL entries in the ACL table is reduced, and a requirement on TCAM resource specifications is lowered, thereby facilitating data center network expansion.

The following describes apparatus embodiments of the present disclosure, and the apparatuses may be used to implement the method embodiment of the present disclosure. For details not disclosed in the apparatus embodiments of the present disclosure, refer to the method embodiment of the present disclosure.

Figure 9:
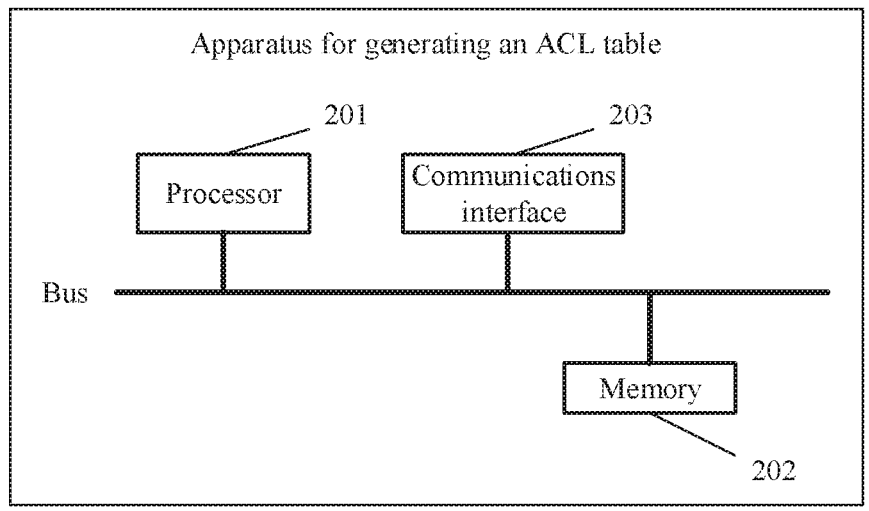
FIG. 9 is a schematic structural diagram of an apparatus for generating an ACL table according to an embodiment of the present disclosure.

FIG. 9 is an apparatus for generating an ACL table according to an embodiment of the present disclosure. The apparatus may be a network device such as a controller, a router, or a switch, and may be applied to a network architecture such as a one-level mesh architecture or a multi-level mesh architecture. The apparatus includes a processor 201, a memory 202, and a communications interface 203. The memory 202 and the communications interface 203 are separately connected to the processor 201. The memory 202 is configured to store program code, where the program code includes a computer operation instruction. The processor 201 executes the program code stored in the memory 202, to implement related processing performed by the controller in the foregoing embodiment; and may communicate with the network device by using the communications interface 203.

The processor 201 includes one or more processing cores. The processor 201 implements the steps and the alternative solutions in the embodiments of the present disclosure by running a software program and a module.

Figure 10:
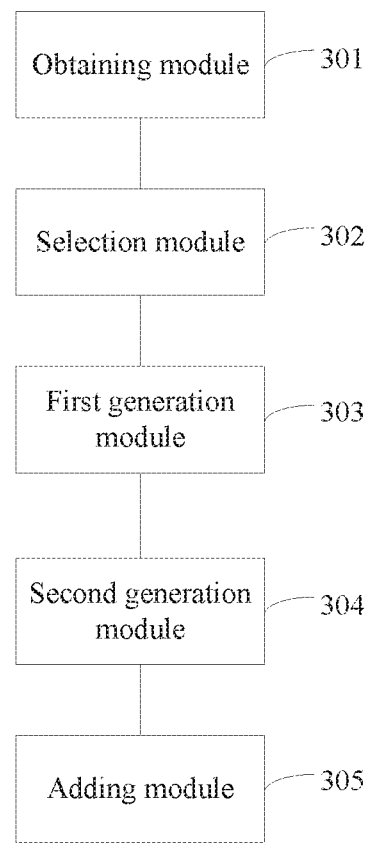
FIG. 10 is a schematic structural diagram of another apparatus for generating an ACL table according to an embodiment of the present disclosure.

FIG. 10 is an apparatus for generating an ACL table according to an embodiment of the present disclosure. The apparatus may be implemented as some or all parts of a controller by using software, hardware, or a combination of software and hardware. The apparatus includes an obtaining module 301, a selection module 302, a first generation module 303, a second generation module 304, and an adding module 305.

When the obtaining module 301 is working, step 101 and its alternative solution in the foregoing embodiment are performed.

When the selection module 302 is working, step 102 and its alternative solution in the foregoing embodiment are performed.

When the first generation module 303 is working, step 103 and its alternative solution in the foregoing embodiment are performed.

When the second generation module 304 is working, step 104 and its alternative solution in the foregoing embodiment are performed.

When the adding module 305 is working, step 105 and its alternative solution in the foregoing embodiment are performed.

It should be noted that when the apparatus for generating an ACL table provided in the foregoing embodiment generates the ACL table, only division of the foregoing functional modules is used as an example for description. In actual application, the foregoing functions may be allocated to different functional modules based on a requirement for implementation. In other words, an internal structure of the apparatus is divided into different functional modules to complete all or some of the functions described above. In addition, the apparatus for generating an ACL table provided in the foregoing embodiment is based on a same concept as the method embodiment for generating an ACL table. For details about an implementation process, refer to the method embodiment. Details are not described herein.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the principle of the present disclosure shall fall within the protection scope of the present disclosure.

What is claimed is:

1. A method for generating an access control list (ACL) table, the method comprising:
    obtaining a port type of each of at least one port of a first network device;
    selecting, based on the port type of each of the at least one port, one or more target ports whose port type is a preset type from all ports of the first network device;
    generating a corresponding first-type ACL entry for each of the one or more target ports;
    generating a second-type ACL entry corresponding to a routing table of the first network device, wherein an action of the second-type ACL entry is redirecting to the routing table, wherein the second-type ACL entry is generated by compressing one or more another first-type ACL entries corresponding to at least one non-target port of the first network device, based on a minimum hop count from each of the at least one non-target port to one of one or more second network devices, wherein each of the at least one non-target port is any port different than the selected one or more target ports of the first network device; and
    adding the second-type ACL entry and the corresponding first-type ACL entry generated for each of the one or more target ports to an ACL table of the first network device.

2. The method according to claim 1, wherein obtaining a port type of each of at least one port of a first network device comprises:
    monitoring each of the at least one port of the first network device after the first network device goes online;
    determining a port type of a first port of the at least one port that is identified in a notification packet received within a preset duration as an interconnection type; and
    determining a port type of a second port of the at least one port that is not identified in the notification packet received within the preset duration as a default type.

3. The method according to claim 2, wherein:
    the interconnection type comprises an intra-group interconnection type and an inter-group interconnection type; and
    determining a port type of a first port of the at least one port identified in a notification packet received within a preset duration as an interconnection type comprises:
        for the first port identified in the notification packet, determining, based on an identifier in the notification packet of a device group to which a peer network device sending the notification packet belongs, whether the peer network device and the first network device belong to a same device group,
        when the peer network device and the first network device belong to the same device group, determining that the port type of the first port is the intra-group interconnection type, and
        when the peer network device and the first network device do not belong to the same device group, determining that the port type of the first port is the inter-group interconnection type.

4. The method according to claim 3, wherein the preset type comprises the default type and the intra-group interconnection type.

5. The method according to claim 1, wherein:
    generating a corresponding first-type access control list (ACL) entry for each of the one or more target ports comprises:
        determining the one or more second network devices in a network architecture in which the first network device is located, wherein each of the one or more second network devices is any network device in the network architecture different from the first network device,
        generating the routing table, wherein each entry of the routing table is created to comprise a next hop from the first network device to the one of the one or more second network devices, and
        for each of the one or more target ports, determining, based on the routing table, an action of each of the one or more target ports corresponding to each of the one or more second network devices, and for each of the one or more second network devices, generating the corresponding first-type ACL entry comprising each of the one or more target ports, each of the one or more second network devices, and the action of each of the one or more target ports corresponding to each of the one or more second network devices.

6. The method according to claim 5, wherein a priority of the second-type ACL entry is lower than a priority of the corresponding first-type ACL entry generated for each of the one or more target ports.

7. The method according to claim 4, wherein:
    generating a corresponding first-type access control list (ACL) entry for each of the one or more target ports comprises:
        determining the one or more second network devices in a network architecture in which the first network device is located, wherein each of the one or more second network devices is any network device in the network architecture different from the first network device,
        generating the routing table, wherein each entry of the routing table comprises a next hop from the first network device to the one of the one or more second network devices, and
        for each of the one or more target ports, determining, based on the routing table, an action of each of the one or more target ports corresponding to each of the one or more second network devices, and for each of the one or more second network devices, generating the corresponding first-type ACL entry comprising each of the one or more target ports, each of the one or more second network devices, and the action of each of the one or more target ports corresponding to each of the one or more second network devices.

8. An apparatus for generating an access control list (ACL) table, the apparatus comprising:

a memory; and a processor coupled to the memory and configured to:
- obtain a port type of each of at least one port of a first network device,
- select, based on the port type of each of the at least one port, one or more target ports whose port type is a preset type from all ports of the first network device,
- generate a corresponding first-type ACL entry for each of the one or more target ports,
- generate a second-type ACL entry corresponding to a routing table of the first network device, wherein an action of the second-type ACL entry is redirecting to the routing table, wherein the second-type ACL entry is generated by compressing one or more another first-type ACL entries corresponding to at least one non-target port of the first network device based on a minimum hop count from each of the at least one non-target port to one of one or more second network devices, wherein each of the at least one non-target port is any port different than the selected one or more target ports of the first network device, and
- add the second-type ACL entry and the corresponding first-type ACL entry generated for each of the one or more target ports to an ACL table of the first network device.

9. The apparatus according to claim 8, wherein the processor is further configured to:
- monitor each of the at least one port of the first network device after the first network device goes online;
- determine a port type of a first port of the at least one port that is identified in a notification packet received within a preset duration as an interconnection type; and
- determine a port type of a second port of the at least one port that is not identified in the notification packet received within the preset duration as a default type.

10. The apparatus according to claim 9, wherein:
the interconnection type comprises an intra-group interconnection type and an inter-group interconnection type; and
the processor is further configured to:
- for the first port identified in the notification packet, determine, based on an identifier in the notification packet of a device group to which a peer network device sending the notification packet belongs, whether the peer network device and the first network device belong to a same device group,
- when the peer network device and the first network device belong to the same device group, determine that the port type of the first port identified in the notification packet is the intra-group interconnection type, and
- when the peer network device and the first network device do not belong to the same device group, determine that the port type of the first port identified in the notification packet is the inter-group interconnection type.

11. The apparatus according to claim 10, wherein the preset type comprises the default type and the intra-group interconnection type.

12. The apparatus according to claim 8, wherein:
the processor is further configured to:
- determine the one or more second network devices in a network architecture in which the first network device is located, wherein each of the one or more second network devices is any network device in the network architecture different from the first network device,
- generate the routing table, wherein each entry of the routing table comprises a next hop from the first network device to the one of the one or more second network devices, and for each of the one more target ports, determine, based on the routing table, an action of each of the one or more target ports corresponding to each of the second network devices, and for each of the one or more second network devices, generate the corresponding first-type ACL entry comprising each of the one or more target ports, each of the one or more second network devices, and the action of each of the one or more target ports corresponding to each of the one or more second network devices.

13. The apparatus according to claim 12, wherein a priority of the second-type ACL entry is lower than a priority of the corresponding first-type ACL entry generated for each of the one or more target ports.

14. The apparatus according to claim 11, wherein:
the processor is further configured to:
- determine the one or more second network devices in a network architecture in which the first network device is located, wherein each of the one or more second network devices is any network device in the network architecture different from the first network device,
- generate the routing table, wherein each entry of the routing table comprises a next hop from the first network device to the one of the one or more second network devices, and
- for each of the one or more target ports, determine, based on the routing table, an action of each of the one or more target ports corresponding to each of the one or more second network devices, and for each of the one or more second network devices, generate the corresponding first-type ACL entry comprising each of the one or more target ports, each of the one or more second network devices, and the action of each of the one or more target ports corresponding to each of the one or more second network devices.

* * * * *